United States Patent [19]
Bishop

[11] 3,911,324
[45] Oct. 7, 1975

[54] FAIL-SAFE POWER SUPPLY
[75] Inventor: Marion M. Bishop, Seattle, Wash.
[73] Assignee: The Boeing Company, Seattle, Wash.
[22] Filed: Sept. 16, 1974
[21] Appl. No.: 506,162

[52] U.S. Cl............. 317/33 VR; 317/31; 321/11; 321/25; 321/47; 323/6; 323/89 TC
[51] Int. Cl.² .......................................... H02H 7/10
[58] Field of Search............... 317/14 R, 14 B, 14 K, 317/33 VR, 31; 321/11, 12, 14, 25, 27 MS, 46, 47; 323/6, 8, 44, 89 TC

[56] References Cited
UNITED STATES PATENTS
| | | | |
|---|---|---|---|
| 3,076,131 | 1/1963 | Weil | 323/89 TC |
| 3,358,210 | 12/1967 | Grossoehme | 221/25 |
| 3,723,850 | 3/1973 | Daniels et al. | 321/47 |

*Primary Examiner*—J. D. Miller
*Assistant Examiner*—Harry E. Moose, Jr.
*Attorney, Agent, or Firm*—Brown, Murray, Flick & Peckham

[57] ABSTRACT

An AC to DC power supply for operational amplifiers and the like requiring positive and negative voltage sources, the supply incorporating means which will cause a short or current surge condition on either the plus or minus terminal of the power supply to reduce the voltage on both terminals. This will prevent the occurrence of a hard-over condition in an analog control system employing the operational amplifier, which hard-over condition would otherwise occur if only one of the positive and negative power supplies were to fail and not the other.

6 Claims, 1 Drawing Figure

U.S. Patent  Oct. 7, 1975  3,911,324
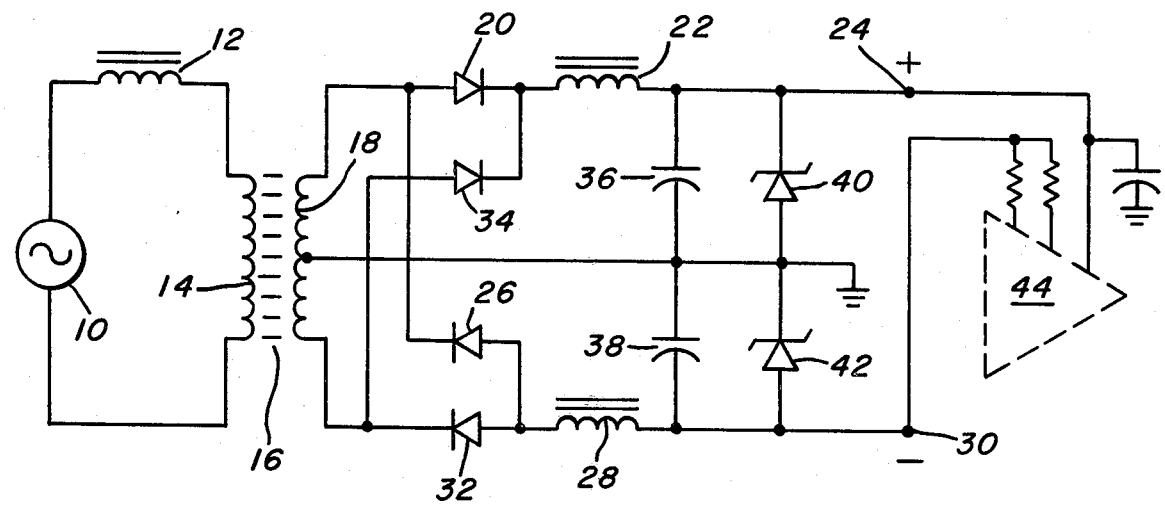

FAIL-SAFE POWER SUPPLY

BACKGROUND OF THE INVENTION

While not limited thereto, the present invention is particularly adapted for use as a power supply for control systems such as those used on hydrofoil seacraft, aircraft and the like where safety is a paramount consideration. In a hydrofoil craft, for example, reliability is vitally important in the roll control system. Such a roll control system comprises sensing means for sensing motion of the craft about the roll axis and means responsive to the signals generated by the sensing means to effect the desired movement of the control surfaces on the foils of the craft to counteract the rolling motion and stabilize the craft about its roll axis. In case of a failure or malfunction in this roll control system, an unsafe condition can develop in which the motion of the craft becomes unstable; and the craft can exhibit divergent motions such that it may impact the water with angular rates of motion and attitudes that can endanger personnel on board the craft or cause possible damage to the craft itself.

In a hydrofoil control system, most "dead" or degraded gain failures (i.e., complete lack of, or reduced control signal) are benign. However, most large amplitude hard-over failures cause large, potentially hazardous boat responses if the hard-over signal path is maintained. Even where the results of hard-over failures are safe, the failure, if not acted on promptly, may cause operational interruptions including the requirement to cease foil-borne operation.

Analog computers used in the control system for hydrofoil craft and other similar applications experience a hard-over failure if either one of the plus or minus voltage sources powering the operational amplifiers in the computer fails. However, this will not happen if both the plus and minus voltage sources fail simultaneously. Complicated and expensive electronic sensing devices can be provided to sense the output of one voltage source and cause the other to track it. These arrangements, however, normally sense only one output and control the other and can themselves fail.

Another disadvantage of prior art power supplies for operational amplifiers utilized in analog computers is that they require a special circuit for overvoltage protection. That is, a special circuit is required to prevent any internal failures from permitting the output voltage to exceed the breakdown voltage of the operational amplifier. The protective circuit in prior art systems senses the output voltage and if it exceeds a given level, an SCR is caused to fire which shorts the power supply, causing an input fuse to open. This method protects the operational amplifier but causes a shutdown of the system until the fuse is replaced, obviously an undesirable condition.

SUMMARY OF THE INVENTION

The present invention provides a new and improved power supply for an operational amplifier utilized in analog computers and the like wherein a short on either the plus or minus voltage supply to the operational amplifier will cause the other to also reduce its voltage by the same amount. This will prevent hard-over failures in control systems of the type described above. These desirable effects are accomplished in a simple, highly reliable circuit consisting of a series inductor, a saturable transformer, rectifiers and capacitors.

An additional advantage of the invention resides in the provision of simple means for providing overvoltage protection for the operational amplifier. In this respect, the power supply of the invention provides overvoltage protection but at the same time limits the voltage without shorting the power supply or causing an input fuse to open. Furthermore, it will return to normal operation upon disappearance of the malfunction, eliminating the necessity for replacing a fuse when an overvoltage condition should occur.

Specifically, there is provided in accordance with the invention a source of alternating current voltage together with a saturable core transformer having a primary winding connected across the alternating current supply. A secondary winding is provided with a center tap adapted for connection to a point of common potential, while rectifier means connect opposite ends of the secondary winding of the saturable transformer to the direct current positive and negative output terminals of the power supply. The arrangement is such that when a short-circuit or current surge occurs between either output terminal and the point of common potential, the core of the saturable transformer will saturate to simultaneously reduce the voltage at both output terminals.

Preferably, Zener diodes are connected between the positive and negative direct current output terminals of the power supply and the point of common potential. In this manner, if the voltage at either terminal exceeds a predetermined level, the Zener diode will break down and the saturable transformer will saturate to reduce the voltage across its secondary.

The above and other objects and features of the invention will become apparent from the following detailed description taken in connection with the accompanying single FIGURE drawing which illustrates one embodiment of the invention.

With reference now to the drawing, there is shown a source of alternating current voltage 10 connected through a current limiting linear inductor 12 to the primary winding 14 of a saturable core transformer 16. As is well known, a saturable core transformer employs a core of square-loop hysteresis material which presents a sharp cutoff point between conditions of saturation and unsaturation. When the core is saturated, there can be no change of flux. Consequently, the voltage across the secondary winding 18 of the transformer drops essentially to zero. Saturation will occur, for example, in the case of a short or current surge across either the upper or lower half of the secondary winding 18. The upper end of the winding 18 is connected through diode 20 and inductor 22 to a positive output terminal 24 of the direct current voltage source. Additionally, the upper end of the winding 18 is connected through a reverse diode 26 and inductor 28 to the negative terminal 30 of the direct current power source. In this manner, current will be supplied to terminal 24 through diode 20 during one-half cycle of the impressed voltage; whereas current will flow from terminal 30 through diode 26 to the upper end of the winding 18 during the other half cycle of the impressed voltage. The lower end of the secondary winding 18 is likewise connected through diode 32 and inductor 28 to negative terminal 30 and through diode 34 and inductor 22 to the positive terminal 34.

Inductors 22 and 28 form with capacitors 36 and 38, respectively, a filter network for filtering the ripple content of the direct current voltage appearing at the output of the diode network just described. In shunt with the capacitors 36 and 38 are Zener diodes 40 and 42, respectively. The output terminals 24 and 30 are shown as being connected, schematically, to an operational amplifier 44 which can, for example, be included in an analog computer network.

If it is assumed, for example, that a short occurs between the output terminal 24 and ground, the current through secondary winding 18 will surge. This causes saturation of the core of transformer 16, causing the voltage across the secondary winding 18 to fall whereby the voltage at both terminals 24 and 30 will fall simultaneously. As a result, the operational amplifier 44 will not be driven hard-over. However, as soon as the short or other current surge is removed, the circuit will return to normal operation with the core of transformer 16 unsaturated. The same result occurs if a short or current surge occurs between terminal 30 and ground. As was explained above, this occurs automatically without the necessity for shutdowns and fuse replacements.

The Zener diodes 40 and 42 are included as an additional safety feature. When the voltage on either terminal 24 or 30 exceeds a predetermined level determined by the characteristics of its associated Zener diode, the diode will break down and the core of transformer 16 will saturate, thereby causing the voltage across the secondary winding 18 to drop. A condition of this sort can occur if the filter choke comprising elements 22 and 36, for example, should fail or if there should be an input power surge.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a power supply, the combination of a source of alternating current voltage, a saturable core transformer having primary and secondary windings thereon, means connecting said alternating current supply across said primary winding, a center tap on said secondary winding connected to a point of common potential, positive and negative output terminals for said power supply, and rectifier means connecting opposite ends of said secondary winding to the respective positive and negative output terminals, the arrangement being such that when a short-circuit or current surge occurs between either output terminal and said point of common potential, the core of said transformer will saturate to simultaneously reduce the voltage at both output terminals with respect to said point of common potential.

2. The power supply of claim 1 wherein said rectifier means comprises a pair of diodes poled to conduct current in one direction and connecting opposite ends of said secondary winding to one of said output terminals, and a pair of diodes poled to conduct current in the opposite direction connecting the opposite ends of said secondary winding to the other of said output terminals.

3. The power supply of claim 2 including filter means connected between said diodes and said point of common potential for filtering the ripple content of the direct current produced by said diodes.

4. The power supply of claim 3 wherein said filter means comprises an inductor connecting an associated pair of diodes to one of said output terminals, and a capacitor connecting the end of said inductor opposite said diodes to said point of common potential.

5. The power supply of claim 1 including Zener diodes connected between each of said output terminals and said point of common potential.

6. The power supply of claim 1 including a linear inductor connecting the source of alternating current voltage to the primary winding on said saturable core transformer.

* * * * *